United States Patent Office 2,698,784
Patented Jan. 4, 1955

2,698,784

REMOVAL OF IMPURITIES FROM STEEL

Leo Henry Timmins, Montreal, Quebec, Canada, assignor to Chromium Mining & Smelting Corporation, Ltd., Montreal, Quebec, Canada, a corporation of Ontario, Canada No Drawing. Application February 6, 1950,
Serial No. 142,713

2 Claims. (Cl. 75—27)

This invention relates to metallurgy and has for an object the provision of improved metallurgical products and processes or methods. More particularly, the invention contemplates the provision of improved products and methods or processes suitable for use in the purification of metals or for use in the elimination of impurities from molten metals. A particular object of the invention is to provide an improved method or process for eliminating or removing sulphur and oxide impurities from molten ferrous metals such as iron and steel. The invention also provides products in the form of exothermic reaction mixtures which may be utilized for effecting a general cleansing action on molten iron and molten steel.

According to some heretofore customary practices, various impurities are removed from molten metals by contacting the molten metals with molten slags capable of extracting or removing the impurities by solution or oxidation or reduction or by various combinations of oxidation, reduction, and solution. Thus, for example, impurities such as phosphorus, sulphur, oxygen and silicon are removed from steel and other ferrous metal products by contacting the steel and other ferrous metal products while molten with molten slags having the properties required for extracting or removing the particular impurity or impurities sought to be removed. Such slags are characterized as basic, acidic or neutral, depending upon their compositions. Purifying slags may be produced by placing solid slag-forming materials on the surfaces of molten metals in the furnaces in which the molten metal baths are prepared, or they may be produced by melting solid slag-forming materials in separate furnaces. It has been proposed, also, to produce slag products of the nature of silicate blast furnace slags and calcium ferrite slags through the use of exothermic reaction mixtures.

The production and use of purifying slags in accordance with some of the heretofore customary procedures involve considerable difficulty and expense. If a slag is produced in the furnace in which the molten metal to be purified is prepared by placing ordinary solid slag-forming material on the surface of a bath of the molten metal, the slag-forming material may chill the molten metal, making further treatment of the metal difficult and resulting in the production of a pasty, viscous slag which functions inefficiently as a purifying slag. Operations involving the production of suitably fluid purifying slags in separate furnaces necessarily require substantial capital expenditures to provide the separate furnaces and necessary auxiliary equipment. Such operations involve the difficulty of handling molten slag rather than solid slag-forming material for effecting contact of molten metal and molten slag. In purification operations of some types employed heretofore, molten slag may be permitted to remain relatively quietly in contact with molten metal, or metal and slag may be subjected to varying degrees of agitation to effect mixing and thus accelerate purifying reactions. In operations in which slag and metal are permitted to remain in relatively quiet contact, purification of the metal is relatively slow and inefficient. In order to accelerate and improve the efficiency of purification, it has been proposed to subject the molten metal and molten slag to such violent intermixing as to cause dispersion of the slag in a fine state of division throughout the metal. Such violent intermixing of slag and metal may be objectionable because of expense and difficulties involved in its accomplishment and because of undesirable oxidation of metal resulting from the exposure of relatively large surface areas of molten metal to the oxygen of the atmosphere. The exothermic reaction mixtures employed for metal purification generally contain a burden of slag-forming material and a heat-producing part or component comprising silicon and sodium nitrate. Such exothermic mixtures produce slags containing silicates of calcium and magnesium with small amounts of alumina which are effective in absorbing and dissolving oxides from molten metals. The exothermic mixtures of the prior art produce, also, basic slags consisting essentially of calcium ferrite which are employed effectively in removing phosphorus from molten steel.

The present invention provides an effective method or process and product for removing sulphur from molten iron and steel and which, also, can be utilized with good effect for removing or eliminating oxides and with some effect for eliminating phosphorus from molten steel.

The improved products of the invention include solid reaction mixtures comprising components capable of reacting and producing a fluid slag consisting largely of calcium aluminate. The reaction mixtures have the capacity for effecting conversion of sulphur and oxygen to forms which are absorbed by and are soluble in the fluid slag resulting from the reaction.

The preferred reaction mixtures of the invention are characterized by the presence therein of calcium oxide, iron oxide and elemental or metallic aluminum all in the form of finely divided solid particles and intimately mixed together to provide optimum conditions for reaction of the components with the development of substantial quantities of heat. In other preferred reaction mixtures of the invention, alumina or alumina and lime in chemical combination, as calcium aluminate may be included with the lime, iron oxide and elemental aluminum. Preferably, all particles comprising a reaction mixture of the invention are small enough to pass a 100-mesh screen.

The calcium oxide and the iron oxide may be employed in their free or uncombined forms or they may be incorporated in the mixture in chemical combination with each other, as, for example, in the form of calcium ferrite.

Calcium oxide may be employed in any suitable proportion relatively to the iron oxide, but it preferably is employed in amount equivalent to not less than one molecule of calcium oxide for each molecule of alumina present in a slag resulting from ignition and reaction of an exothermic reaction mixture of the invention.

The preferred metal purification methods of the invention involve the pouring of a molten metal, such as molten steel from a furnace or other container into contact with or through a layer or other form of a mass or body of fluid molten slag produced as the result of ignition and reaction of an exothermic reaction mixture of the invention. Pouring may be carried out from a considerable height, that is, with the pouring spout or lip disposed at an elevation substantially higher than the elevation of the ladle containing the molten slag so that a violent intermixing of the slag and metal with dispersion of the metal in the slag will be effected, or, pouring of the molten metal may be so conducted that a gently boiling mass of metal is produced beneath a slag layer during the pouring operation, without substantial disruption of the slag layer. The boiling effect causes effective and repeatedly renewed contact of substantially all portions of the molten metal with the under surface of the slag layer while maintenance of a substantially continuous slag layer prevents exposure of the molten metal to oxidation by the oxygen of the atmosphere.

The reaction mixtures of the invention may be employed in the form of loose powders or in the form of agglomerates of any suitable sizes, and they may be ignited in any suitable manner when employed in carrying out a method or process of the invention. They may be ignited by contact with the molten metals at the commencement, during the course of, or at or near the conclusion of the pouring operations, or they may be ignited in any other suitable manner, and they may be ignited separately, in the treatment ladle or elsewhere, to form fluid slags which may be contacted with the molten metals to be purified while they (the slags) are molten. The entire amount of reaction mixture to be employed in the treatment of a batch of metal may be employed or ignited all at one time or in two or more increments.

When a reaction mixture of the invention is ignited in a ladle or other receptacle by contact with molten metal to be treated, the first increment of metal poured effects ignition of the reaction mixture with the production of a quantity of fluid slag. When pouring is carried out gently, a layer of fluid slag is formed upon pouring of the first increment of molten metal, and the remainder of the molten metal poured into the receptacle passes through the layer of molten slag thus formed.

When employed in the treatment of molten steel, the invention provides exothermic reaction mixtures capable of producing four-fold results, namely, (1) A reduction of calcium oxide by means of elemental or metallic aluminum with resulting reduction of the iron combined with sulphur by the reduced calcium and the production of calcium sulphide which enters and remains in the slag, in accordance with the following equation:

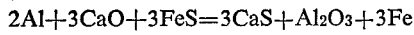

$$2Al + 3CaO + 3FeS = 3CaS + Al_2O_3 + 3Fe$$

(2) A reduction of undesirable oxide contained in the molten steel with the production of aluminum oxide which enters the slag and with consequent cleansing of the steel.

(3) The development of a large quantity of heat, sufficient to provide a highly fluid slag which may have a temperature several hundred degrees higher than the temperature of molten steel undergoing treatment and which, because of the heat contained therein, promotes desirable reactions within the reaction mixture, within slag and within the molten metal adjacent the slag, and (4) The provision of a fluid slag which is an excellent solvent for receiving and retaining undesirable impurities leaving the molten metal during the purification treatment.

The compositions of the exothermic reaction mixtures of the invention may be adjusted to produce slags in a wide range of temperatures and of varying degrees of fluidity. The slags depend for heat-developing capacity on a reaction between iron oxide and elemental aluminum. Lime, calcium oxide (CaO) is an essential ingredient of a reaction mixture of the invention and alumina ($Al_2O_3$) is an essential ingredient of the product of reaction of an exothermic reaction mixture of the invention. The calcium oxide employed in the exothermic reaction mixture may be present in the free or uncombined state or all or part of it may be present in chemical combination with iron oxide as, for example, in the form of calcium ferrite. (Some calcium oxide employed in forming a reaction mixture may be combined chemically with alumina, as will be pointed out hereinafter.) In the final slag product, the calcium oxide is at least partly combined with alumina or all of it may be combined with alumina, depending on the relative amounts or proportions of the calcium oxide, iron oxide and elemental aluminum employed.

Preferably, iron oxide and elemental aluminum are present in an exothermic reaction mixture in proportions such that the amount of aluminum present is in substantial excess of that required to reduce to the elemental state all of the iron of the iron oxide present in the exothermic reaction mixture. The use of elemental aluminum in an amount that includes an excess equal to not less than about fifteen percent (15%) by weight of the amount required to reduce to the elemental state all of the iron of the iron oxide has been found to be highly satisfactory. An excess in the range of about fifteen to twenty percent (15% to 20%) can be used with advantage.

The amount of calcium oxide employed in any reaction mixture will depend upon the basicity, fluidity and temperature of the slag sought. The minimum amount of calcium oxide employed in an exothermic reaction mixture of the invention is an amount not less than that required to form mono-calcium aluminate with all alumina that may be present in a slag product resulting from ignition and reaction of an exothermic reaction mixture of the invention. Calcium oxide may be employed in amounts sufficient to provide from one to three or more molecules of calcium oxide for each molecule of alumina present in a slag product resulting from ignition and reaction of an exothermic reaction mixture of the invention. Excellent results have been obtained in using calcium oxide in amounts equivalent to 2.5 to 4.35 molecules of calcium oxide for each molecule of alumina present in the slag reaction product.

Calcium oxide may be employed for the purpose of controlling basicity, and for the additional purpose of controlling the temperature of the slag produced by reaction, by absorption of some of the heat produced by reaction of the elemental aluminum with the iron oxide.

Pre-formed alumina, also, may be employed for aiding in controlling or limiting the temperature of the slag produced. The pre-formed alumina may be incorporated in the reaction mixture, for heat absorption purposes, as such or as calcium aluminate. If preformed alumina is employed, calcium oxide is provided for combination with it in the same proportion as it is provided for combination with alumina formed by the reaction of elemental aluminum with iron oxide.

Any suitable form of iron oxide may be employed. Mill scale (magnetite, $Fe_3O_4$) and hematite (ferric oxide, $Fe_2O_3$) have been employed satisfactorily. The iron oxide should be free of undesirable impurities. Mill scale provides a source of suitably pure iron oxide. If mill scale or magnetite is to be combined with calcium oxide, it should be oxidized to ferric oxide preliminarily or heated with the calcium oxide under conditions of oxidation permitting conversion of ferric oxide ($Fe_2O_3$).

The elemental aluminum, the lime and any alumina or other component employed in forming the reaction mixtures of the invention should be selected carefully to avoid the introduction into the reaction mixtures of substances capable of introducing undesirable impurities into molten metal.

In a preferred method or process of the invention, the exothermic reaction mixture employed is one capable of producing upon ignition and reaction a fluid molten slag consisting essentially of calcium aluminate or calcium aluminate and calcium oxide. When the temperature developed by the reaction is above the temperature of decomposition of tri-calcium aluminate or other calcium aluminates, a slag containing calcium oxide and alumina in the proportions necessary for forming the decomposable compound or compounds probably will consist of a mixture of calcium oxide or of a solution of calcium oxide in calcium aluminate. Regardless of the exact composition, slags containing calcium oxide and alumina in proportions of from about one to about five or more molecules of calcium oxide for each molecule of alumina function similarly, though in most instances slags containing at least two molecules of calcium oxide for each molecule of alumina function more effectively for the elimination of sulphur from steel. Accordingly, fluid slags containing no other substance than calcium oxide and alumina in substantial amount may be regarded as consisting essentially of calcium aluminate.

The raw materials such as lime and iron oxide employed in forming exothermic mixtures in accordance with the invention may contain small amounts of foreign materials such as silica, and reduction of the iron oxide upon ignition of a reaction mixture may not be complete. Consequently, a molten slag produced upon ignition and reaction may contain small amounts of silica and iron oxide. Even when small amounts of silica and iron oxide are present in a slag consisting otherwise only of calcium oxide and alumina, the slag will have the properties of and will function as a calcium aluminate slag.

Slags produced in igniting and reacting exothermic reaction mixtures of the invention are basic, and initially, they are reducing in character. If the conditions of use in treating molten metal are such as to provide for rapid oxidation of all of the elemental aluminum contained in a reaction mixture, the character of the slag produced may change from reducing to neutral or oxidizing and some phosphorus removal from the molten metal may result.

Following are analyses of some typical slags produced by ignition and reaction of reaction mixtures of the invention showing percentage compositions:

| Slag number | $Al_2O_3$ | CaO | FeO | $SiO_2$ |
|---|---|---|---|---|
| 1 | 45.75 | 52.00 | 1.95 | 1.18 |
| 2 | 37.74 | 57.86 | 3.30 | 0.43 |
| 3 | 53.50 | 45.48 | 1.50 | 0.30 |
| 4 | 37.90 | 60.13 | 3.00 | 0.38 |

Any suitable amount of a reaction mixture of the invention may be employed in treating molten metal in accordance with a method or process of the invention. Preferably, in treating a heat or batch of molten steel for the purpose of removing sulphur, the steel is contacted with a molten calcium aluminate slag formed by igniting an exothermic reaction mixture in amount greater than six-tenths of one percent (0.6%) of the weight of the heat or batch of molten steel and comprising calcium oxide, iron oxide and elemental aluminum. In preferred methods or processes of the invention for treating heats or batches of molten steel for the removal of sulphur, exothermic reaction mixtures capable of producing molten calcium aluminate slags are employed in amounts by weight in the range, six-tenths of one percent (0.6%) to eight percent (8.0%) of the weights of the heats or batches of molten steel.

Reaction mixtures of the invention react rapidly, and the reactions go to completion in very short periods of time. Reactions may be completed in periods of time ranging from about one-half minute to three or four minutes. The time of treatment of a heat of steel with a molten slag produced in accordance with the invention also is brief. Usually the time of treatment or contact of the metal with the slag will be that period of time required for tapping the heat with, possibly, additional contact until the metal is cast into ingots.

The following examples illustrate the reaction mixtures and methods or processes of the invention.

Reaction mixtures containing the following components in the proportions by weight set forth in finely divided forms and intimately mixed by grinding the components together in a ball mill have been employed with advantage in carrying out methods or processes of the invention.

REACTION MIXTURE No. 1

| | Parts |
|---|---|
| Calcined lime (CaO) | 80 |
| Mill scale (Fe$_3$O$_4$) | 100 |
| Aluminum powder | 40 |

REACTION MIXTURE No. 2

| | Parts |
|---|---|
| Calcined lime (CaO) | 100 |
| Mill scale (Fe$_3$O$_4$) | 100 |
| Aluminum powder | 40 |

REACTION MIXTURE No. 3

| | Parts |
|---|---|
| Calcined lime (CaO) | 60 |
| Mill scale (Fe$_3$O$_4$) | 100 |
| Aluminum powder | 40 |

REACTION MIXTURE No. 4

| | Parts |
|---|---|
| Calcined lime (CaO) | 120 |
| Mill scale (Fe$_3$O$_4$) | 100 |
| Aluminum powder | 40 |

REACTION MIXTURE No. 5

| | Parts |
|---|---|
| Calcined lime (CaO) | 140 |
| Mill scale (Fe$_3$O$_4$) | 100 |
| Aluminum powder | 40 |

The data set forth in the following examples illustrate methods or processes of the invention employing reaction mixtures of the compositions set forth above. The data were obtained in treating heats or batches of steel varying in weight from 200 pounds to 80 tons or 160,000 pounds.

*Example No. 1*

An eleven pound batch of Reaction Mixture No. 2 in powder form was ignited and reacted separately in a hot silicon carbide crucible with the production of a very fluid slag product. The fluid slag product and a 200 pound heat of steel of known analysis were poured simultaneously into a ladle under conditions promoting fairly effective mixing. The metal and slag were separated and the metal was analyzed.

METAL ANALYSES

| | Before treatment | After treatment |
|---|---|---|
| S | 0.055 | 0.045 |
| P | 0.014 | 0.013 |
| Mn | 0.40 | 0.42 |
| C | 0.14 | 0.11 |
| Si | 0.28 | |

*Example No. 2*

A twenty-two pound batch of Reaction Mixture No. 2 in powder form was ignited and reacted separately in a hot silicon carbide crucible with the production of a hot fluid slag product. The molten slag product subsequently was poured into a ladle simultaneously with the pouring into the ladle of a 400 pound heat of steel of known analysis. The metal and slag were separated, and the metal was analyzed.

METAL ANALYSES

| | Before treatment | After treatment |
|---|---|---|
| S | 0.056 | 0.044 |
| P | 0.013 | 0.014 |
| Mn | 0.36 | 0.39 |
| C | 0.15 | 0.15 |
| Si | 0.36 | 0.37 |

*Example No. 3*

An eleven pound batch of Reaction Mixture No. 2 was ignited and reacted in a hot ladle with the production of a molten slag. Immediately after completion of the reaction, 200 pounds of molten steel of known analysis were poured into the ladle and into contact with the molten slag therein. Another eleven pound batch of Reaction Mixture No. 2 was placed on the surface of the metal and slag bath in the ladle, and the mixture was stirred with an iron for a short period of time. Another 200 pound batch of steel from the same source as that contacted with slag produced by reaction of the first eleven pound increment of Reaction Mixture No. 2 was poured into the ladle containing the molten bath of steel and slag. The metal and slag were separated, and the metal was analyzed.

METAL ANALYSES

| | Before treatment | After treatment |
|---|---|---|
| S | 0.047 | 0.029 |
| P | 0.016 | 0.014 |
| Mn | 0.50 | 0.50 |
| C | 0.18 | 0.18 |
| Si | 0.32 | 0.38 |

*Example No. 4*

The procedure followed in Example No. 3 was carried out with substitution of Reaction Mixture No. 1 for Reaction Mixture No. 2 in the treatment of molten steel of known analysis. The slag and metal were separated, and the metal was analyzed.

METAL ANALYSES

| | Before treatment | After treatment |
|---|---|---|
| S | 0.025 | 0.009 |
| P | 0.013 | 0.013 |
| Mn | 0.45 | 0.46 |
| C | 0.14 | 0.14 |
| Si | 0.28 | 0.38 |

*Example No. 5*

The procedure followed in Examples Nos. 3 and 4 was carried out with substitution of Reaction Mixture No. 4 for Reaction Mixtures Nos. 2 and 1, respectively, in the treatment of molten steel of known analysis. The slag and metal were separated, and the metal was analyzed.

METAL ANALYSES

| | Before treatment | After treatment |
|---|---|---|
| S | 0.045 | 0.017 |
| P | 0.013 | 0.010 |
| Mn | 0.40 | 0.41 |
| C | 0.14 | 0.15 |
| Si | 0.38 | 0.39 |

Example No. 6

The procedure followed in Example No. 4 was carried out with the same reaction mixture (No. 1) in the same amount in treating steel of a different known analysis. The metal and slag were separated, and the metal was analyzed for sulphur.

METAL ANALYSES

|  | Before treatment | After treatment |
|---|---|---|
| S | 0.047 | 0.025 |

Example No. 7

The procedure of Example No. 5 was carried out with the same reaction mixture (No. 4) in the same amount in treating steel of a different known composition. The slag and metal were separated, and the metal was analyzed for sulphur.

METAL ANALYSES

|  | Before treatment | After treatment |
|---|---|---|
| S | 0.048 | 0.020 |

Example No. 8

The procedure of Examples Nos. 5 and 7 was carried out with the same reaction mixture (No. 4) but in one-half the amount employed in the procedures of Examples Nos. 5 and 7 in the treatment of a different steel of known analysis. The metal and slag were separated, and the metal was analyzed for sulphur.

METAL ANALYSES

|  | Before treatment | After treatment |
|---|---|---|
| S | 0.020 | 0.004 |

Example No. 9

The procedure followed in Example No. 8 was carried out with the same reaction mixture (No. 4) in the same amount in the treatment of different steel of known analysis, except that a pool of metal about one inch deep was formed in the bottom of the ladle prior to the introduction of the first increment of Reaction Mixture No. 4. The metal and slag were separated, and the metal was analyzed for sulphur.

METAL ANALYSES

|  | Before treatment | After treatment |
|---|---|---|
| S | 0.054 | 0.024 |

Example No. 10

The procedure followed in Example No. 8 was carried out with the same reaction mixture (No. 4) but in one-half the amount employed in the procedure of Example No. 8 for treating different steel of known analysis. The amount of reaction mixture employed for treating 400 pounds of steel was 5.5 pounds. The metal and slag were separated, and the metal was analyzed for sulphur.

METAL ANALYSES

|  | Before treatment | After treatment |
|---|---|---|
| S | 0.040 | 0.026 |

Example No. 11

A quantity of Reaction Mixture No. 2 in powder form equal to four percent (4.0%) by weight of the weight of molten steel to be treated was ignited and reacted in a hot ladle with the production of a fluid molten slag. Immediately upon completion of the reaction, molten steel of known analysis was poured into the ladle and mixed with the molten slag therein. The molten slag and the molten steel subsequently were separated, and the steel was analyzed.

METAL ANALYSES

|  | Before treatment | After treatment |
|---|---|---|
| S | 0.072 | 0.042 |
| Mn | 0.64 | 0.69 |
| C | 0.49 | 0.48 |
| Si | 0.47 | 0.47 |

Example No. 12

A quantity of Reaction Mixture No. 4 in powder form equal in weight to eight percent (8.0%) by weight of the weight of molten steel to be treated was ignited and reacted in a hot ladle with the production of a fluid molten slag. Immediately upon completion of the reaction, molten steel of known analysis was poured into the ladle and mixed with the molten slag therein. The molten slag and the molten steel subsequently were separated, and the steel was analyzed.

METAL ANALYSES

|  | Before treatment | After treatment |
|---|---|---|
| S | 0.055 | 0.036 |
| Mn | 0.45 | 0.51 |
| C | 0.73 | 0.74 |
| Si | 0.13 | 0.11 |

Example No. 13

A quantity of Reaction Mixture No. 1 in powder form in amount equal to 31.7 pounds per ton of metal to be treated was placed in a ladle, and a heat of molten steel of known analysis weighing about 75 tons was poured into the ladle and into contact with the reaction mixture therein. Contact with the molten steel caused ignition of the reaction mixture which reacted rapidly forming a fluid molten slag that mixed with the molten metal during the pouring operation. The slag and metal subsequently were separated, and the metal was analyzed for sulphur.

METAL ANALYSES

|  | Before treatment | After treatment |
|---|---|---|
| S | 0.042 | 0.035 |

Example No. 14

The procedure of Example No. 13 was followed in treating a 75 ton heat of steel except that the reaction mixture (No. 1) was employed in amount equal to 28.9 pounds per ton of metal to be treated, and the reaction mixture was ignited and reacted in the ladle with the production of a fluid molten slag before the pouring operation was commenced. The metal and slag were separated and the metal was analyzed for sulphur.

METAL ANALYSES

|  | Before treatment | After treatment |
|---|---|---|
| S | 0.042 | 0.034 |

Example No. 15

A quantity of Reaction Mixture No. 2 in powder form equal in weight to 29.3 pounds per ton of steel to be treated was ignited and reacted in a ladle with the production of a fluid molten slag, a 75 ton heat of molten steel was poured gradually into the ladle and into contact with the molten slag therein. The metal and slag subsequently were separated, and the metal was analyzed.

METAL ANALYSES

|   | Before treatment | After treatment |
|---|---|---|
| S | 0.040 | 0.030 |

In the following examples (Nos. 16 to 21) reaction mixtures of the types indicated were ignited and reacted in ladles in the amounts indicated to produce fluid molten slags, and molten steel heats of the weights indicated were poured into the ladles and into contact with the molten slag products therein with elimination of sulphur to the extent noted.

Example No. 16

Weight of molten steel _____ 75.3 tons.
Type of reaction mixture employed _____ No. 4.
Amount of reaction mixture employed (3,570 pounds). 2.37%.
Sulphur in steel before treatment _____ 0.025.
Sulphur in steel after treatment _____ 0.022.

Example No. 17

Weight of molten steel _____ 80.6 tons.
Type of reaction mixture employed _____ No. 4.
Amount of reaction mixture employed (4,480 pounds). 2.78%.
Sulphur in steel before treatment _____ 0.032.
Sulphur in steel after treatment _____ 0.022.

Example No. 18

Weight of molten steel _____ 73.3 tons.
Type of reaction mixture employed _____ No. 5.
Amount of reaction mixture employed (875 pounds). 0.6%.
Sulphur in steel before treatment _____ 0.041.
Sulphur in steel after treatment _____ 0.038.

Example No. 19

Weight of molten steel _____ 75.3 tons.
Type of reaction mixture employed _____ No. 5.
Amount of reaction mixture employed (1,850 pounds). 1.23%.
Sulphur in steel before treatment _____ 0.044.
Sulphur in steel after treatment _____ 0.034.

Example No. 20

Weight of molten steel _____ 81.3 tons.
Type of reaction mixture employed _____ No. 5.
Amount of reaction mixture employed (2,100 pounds). 1.30%.
Sulphur in steel before treatment _____ 0.034.
Sulphur in steel after treatment _____ 0.024.

Example No. 21

Weight in molten steel _____ 82.7 tons.
Type of reaction mixture employed _____ No. 5.
Amount of reaction mixture employed (5,635 pounds). 3.35%.
Sulphur in steel before treatment _____ 0.074.
Sulphur in steel after treatment _____ 0.052.

I claim:
1. The method of purifying molten ferrous metal which comprises contacting the molten metal with a fluid slag formed by igniting an exothermic reaction mixture consisting essentially of intimately mixed, solid, finely divided particles of calcium oxide and iron oxide in chemical combination as calcium ferrite and elemental aluminum in amount in excess of that required to reduce to the elemental state all of the iron of the iron oxide.

2. An exothermic reaction mixture capable of reacting upon ignition to produce a molten slag containing calcium aluminate and suitable for use in the purification of metals consisting essentially of intimately mixed, solid, finely divided particles of calcium oxide and iron oxide in chemical combination as calcium ferrite and elemental aluminum in amount in excess of that required to reduce to the elemental state all of the iron of the iron oxide.

References Cited in the file of this patent

UNITED STATES PATENTS

| 875,345 | Goldschmidt | Dec. 31, 1907 |
| 1,432,289 | Hamilton et al. | Oct. 17, 1922 |
| 1,658,879 | Browne | Feb. 14, 1928 |
| 2,193,593 | Heuer | Mar. 12, 1940 |
| 2,232,403 | Perrin | Feb. 18, 1941 |
| 2,232,745 | Udy | Feb. 25, 1941 |
| 2,247,262 | Udy | June 24, 1941 |
| 2,282,175 | Emerson | May 5, 1942 |
| 2,416,179 | Kemmer | Feb. 18, 1947 |

FOREIGN PATENTS

| 113,762 | Australia | Sept. 11, 1941 |